UNITED STATES PATENT OFFICE 2,065,112

PROCESS FOR SEPARATING ACIDIC GASES

Robert Roger Bottoms, Louisville, Ky., assignor to The Girdler Corporation, Louisville, Ky., a corporation of Delaware No Drawing. Application December 1, 1933, Serial No. 700,613

6 Claims. (Cl. 23—2)

In my prior Patent No. 1,783,901, reissued September 26, 1933 as Re. No. 18,958, I have disclosed and broadly claimed a process for separating acidic gases from gaseous mixtures, in which process there is used an aliphatic or cycloparaffin amine which is free from carboxyl or carbonyl groups. Various different amines of this character and which are suitable for the purpose are identified in the specification of said patent.

In carrying out the invention disclosed in said patent very great advantages are achieved over any prior art process known to me.

My present invention is based upon the discovery that certain amines which were not disclosed in said patent, but which come within the broad class of compounds there disclosed, possess certain advantages which are not possessed by any of the compounds disclosed in said patent. Many of the amine compounds identified in said patent are primary alcohols, and compounds in that group may under some conditions be easily oxidized to aldehyde or carboxylic acid by the oxygen of the air in the presence of metal catalysts, such as iron or its oxids. The catalyst may be the metal walls of the apparatus or the iron oxid resulting from the oxidation of the iron of said walls. The oxidation of the primary alcohol to a carboxylic acid increases the corrosion or oxidation of the metal. Such corrosion or oxidation does not prevent the commercial use of the process and may be substantially prevented by the addition of other compounds such as arsenic or vanadium as set forth in my Patent No. 2,031,632, issued February 25, 1936.

My present invention is based upon the discovery that the hydroxyl groups of certain amines are not oxidized to acid groups under operating conditions and therefore by means of my present invention I am able to prevent the corrosion of the equipment without the necessity for using compounds which will prevent or retard corrosion.

I have discovered that by the use of certain oxygenated nitrogen compounds which do not contain either carboxyl or carbonyl groups or a primary alcohol group, but which do contain a secondary or tertiary alcohol group or an ether group, the oxidation is prevented and at the same time they have high absorptive value and easily give up the absorbed gas upon heating and without any loss or substantial loss during the heating operation. It is desirable to use aliphatic amines which contain a secondary or tertiary alcohol group because the hydroxyl group of the alcohol increases the solubility of the compound in water and thus gives a higher absorptive factor for a given volume of liquid. The hydroxyl groups of the secondary and tertiary alcohols likewise raise the boiling point and therefore lower the vaporization losses.

Among the compounds which are suitable for use in my present process are aliphatic amines containing a secondary alcohol group such as 1-3-diaminopropanol-2, or compounds containing a tertiary alcohol group such as 1-3-diamino-2 methyl propanol-2, or compounds containing an ether group such as ββ' diamino diethyl ether, or cyclic amino ethers such as morpholine—

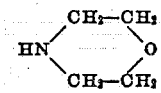

and dimethyl morpholine

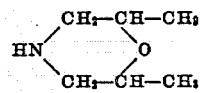

The diaminopropanol may be in the form of the hydrate, iso-propanol-diammonium oxid. A given volume of a 35% water solution of this compound will have approximately twice the absorptive capacity of a 50% solution of triethanolamine. Therefore only one-half the amount of the solution need be circulated for treating a given volume of gas containing a given percentage of carbon dioxid to entirely remove said carbon dioxid. Iso-propanol-diammonium oxid has two active nitrogen atoms per molecule, whereas triethanolamine has only one.

In carrying out my improved process the solution may be passed through a bubble tower or other absorption unit in countercurrent to the flow of the gas to be treated and the solution with the absorbed gas may be permitted to trickle down through a regenerator heated at the bottom to drive off the absorbed gas. The liquid from the base of the regenerator may be cooled and returned to the top of the absorber, all as fully disclosed in my prior patent above referred to.

Although some compounds have either a secondary alcohol or a tertiary alcohol group and likewise a primary alcohol group, I have found it desirable to use only those compounds which do not have any primary alcohol group because the presence of such a group tends to permit or facilitate oxidation.

The process may be employed for removing the same class of acidic gases as referred to in my prior patent, namely, carbon dioxide and hydrogen sulfide, and may remove these gases in order to separate and recover them or merely to remove them as undesirable ingredients of the gas being treated and purified.

It is preferable to use only those compounds or solutions thereof which have a boiling point not substantially below 100° C.

This application is a continuation in part of my prior application Serial No. 576,952, filed November 23, 1931.

Having thus described my invention, what I claim as new and desire to secure by Letters Patent is:

1. The process of separating carbon dioxide from gaseous mixtures in the presence of metallic walls, and whereby corrosion of said metallic walls is substantially prevented, which includes effecting intimate contact of a gaseous mixture with an absorbent agent in liquid form which will liberate the carbon dioxide upon subsequent treatment and become regenerated, and which includes an oxygenated nitrogen compound selected from the group consisting of amines free from carboxyl, carbonyl or primary alcohol groups and which contains secondary or tertiary alcohol groups or an ether group.

2. The process of separating an acidic gas from gaseous mixtures in the presence of metallic walls, which includes effecting intimate contact of a gaseous mixture with an absorbent agent in liquid form which will absorb said acidic gases without substantial corrosion of said metallic walls and which will liberate the acidic gas upon subsequent treatment and become regenerated, and which includes an oxygenated nitrogen compound selected from the group consisting of amines free from carboxyl, carbonyl or primary alcohol groups and which contains secondary or tertiary alcohol groups.

3. The process of treating a gaseous mixture in the presence of metallic walls including carbon dioxid, which includes circulating a water solution of an amine containing 3 to 6 carbon atoms, 1 to 2 nitrogen atoms and 1 oxygen atom, and the remainder all hydrogen atoms, and containing a secondary or tertiary alcohol group and which does not contain carboxyl, carbonyl or primary alcohol groups, whereby corrosion of said metallic walls is substantially prevented.

4. The process of separating acidic gases from gaseous mixtures in the presence of metallic walls, which includes effecting intimate contact of the gaseous mixture with an absorbent in liquid form, and which is not oxidized to any substantial extent in said process, said absorbent including 1-3-diaminopropanol-2, and thereafter treating said absorbent agent to separate therefrom absorbed gases.

5. The process of separating acidic gases from gaseous mixtures in the presence of metallic walls, which includes effecting intimate contact of the gaseous mixture with an absorbent in liquid form, and which is not oxidized to any substantial extent in said process, said absorbent including 1-3-diamino-2 methyl propanol-2, and thereafter treating said absorbent agent to separate therefrom the absorbed gases.

6. The process of separating acidic gases from gaseous mixtures in the presence of metallic walls, which includes effecting intimate contact of the gaseous mixture with an absorbent in liquid form, and which is not oxidized to any substantial extent in said process, said absorbent including $\beta\beta'$ diamino diethyl ether, and thereafter treating said absorbent agent to separate therefrom the absorbed gases.

ROBERT ROGER BOTTOMS.